United States Patent [19]
Bernal

[11] Patent Number: 4,615,671
[45] Date of Patent: Oct. 7, 1986

[54] DIE TO PRODUCE MESH IN NON-METALLIC MATERIALS

[76] Inventor: Eustaquio O. Bernal, Malaga No. 2457, Col. Sta. Monica Guadalajara, Jalisco, Mexico

[21] Appl. No.: 738,451

[22] Filed: May 28, 1985

[51] Int. Cl.[4] .......................... B32B 3/12; B29C 17/00

[52] U.S. Cl. .................................... 425/289; 425/290; 425/294; 29/6.1; 29/6.2; 264/146; 264/147; 83/332

[58] Field of Search ............... 264/146, 147, 154, 156; 425/289, 290, 294, 397; 83/332, 620, 697; 29/6.1, 6.2

[56] References Cited

U.S. PATENT DOCUMENTS

| | | | |
|---|---|---|---|
| 2,237,051 | 4/1941 | Gersman | 29/6.1 |
| 2,304,759 | 12/1942 | Carroll | 29/6.1 X |
| 2,728,950 | 2/1969 | Annesses | 264/147 |
| 3,363,589 | 1/1968 | Addington | 425/289 |
| 3,427,912 | 2/1969 | Nogaawa et al. | 83/332 X |
| 3,518,334 | 6/1970 | Earrigan et al. | 425/397 X |
| 3,744,404 | 7/1973 | Eisendrath et al. | 425/290 X |
| 3,864,198 | 2/1975 | Jackson | 264/146 X |
| 3,891,494 | 6/1975 | Hunter | 425/290 X |
| 3,950,474 | 4/1976 | Cunningham | 264/147 |
| 3,975,974 | 8/1976 | Harris | 425/289 X |
| 3,994,215 | 11/1976 | Rabeler | 425/294 X |
| 4,132,519 | 1/1979 | Reed | 264/156 X |
| 4,155,693 | 5/1979 | Raley | 425/290 X |
| 4,265,956 | 5/1981 | Colijn | 264/146 X |
| 4,305,187 | 12/1981 | Iwamura et al. | 29/6.1 X |

*Primary Examiner*—J. Howard Flint, Jr.
*Attorney, Agent, or Firm*—Roger A. Marrs

[57] ABSTRACT

The present invention is related to a new process and equipment to produce mesh in non-metallic materials such as leather having a wide application in industrial and commercial fields. The process produces a variety of cuts or incisions in a relatively flat and thin, non-metallic material and then subjecting it to different treatments which include introducing the material into a steam chamber, extruding it, molding it and, if desired, submitting same to a heat treatment in order to keep the shape of the mesh during its practical usage and, if desired, further subjecting same to a final finish.

12 Claims, 4 Drawing Figures

DIE TO PRODUCE MESH IN NON-METALLIC MATERIALS

BACKGROUND OF THE INVENTION

Nowadays, a process called "swage" is employed which consists of marking, through pressure, a flat material such as cardboard or paper to produce a series of swage ridges or raised irregularities which is useful in limited industrial and commercial fields such as the wrapping or packing of different products. These swages have been used for several years in packing medical ampoules, soaps and other kinds of goods and in the paper industry in several common uses in stationery. These swaging processes are very simple because they consist in making the materials without submission to elaborate additional operations and without application of such processes to materials different from cardboard and paper.

These observations serve to differentiate perfectly the equipment and process of the invention from the conventional swaging operations because, according to the invention, the first step of performing cuts or incisions in the starting materials is followed by other steps and and treatments whose main purpose is to produce a stable and non-deforming mesh in the finished material in a flat condition. It is obvious that a mesh under a deforming stress becomes tense and modifies the size of the openings of the intercrossed material which forms it; however in the case of a conventional mesh, the material does not usually acquire its original shape which is a disadvantage not present in the material resulting from the invention. As it will be seen later on, the further treatment applied to the material which was previously cut or grooved has the purpose of keeping the "memory" of the shape in the mesh obtained through such material so that, once subjected to stress and usage, the mesh preserves the formed structure or irregularities or ridges obtained at the end of the process.

On the other hand, the production of mesh for industrial and ornamental purposes from materials such as leather and plastic is conventionally performed through knitting which is a completely different technique from the one of the present invention, or through cuts or dies applied to the material which waste those particles of material whose separation forms the openings of the mesh. These conventional systems do not involve additional treatments and besides, they are performed with a great loss of the cut particles of material, contrary to the present invention which involves several additional stages for the treatment of the cut material using the same completely, resulting in a considerable savings.

SUMMARY OF THE INVENTION

The disadvantages of the conventional systems to produce mesh from non-metallic materials are overcome by the equipment or die of the present invention.

The unitary invention which is described herewith comprises the equipment for the production of mesh from non-metallic materials. The process involves making cuts in a certain manner on the material and, later on, depending on the kinds and characteristics of the material, performing a steam treatment on the material with the cuts followed then by a stretching stage followed by the molding of the same material and, if required, submitting same to heat inside a furnace, submitting to operations intended to preserve the original shape of the mesh and, finally, furnishing an ornamental finish to the same mesh.

The practical usage of the mesh is very widespread in the office as well as in industry, housekeeping, sports, and mens or womens wear.

It is, therefore, one of the purposes of this invention to provide a die to produce mesh in non-metallic materials without waste of material.

Another purpose is that the process is carried out with preformed dies under pressure of flat presses or rotary presses in the cutting stage.

One more purpose is that the physiochemical conditions of the process, in its different stages, produces a mesh that keeps its final shape.

Still another purpose is the special equipment used for the performance of the mentioned process.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 shows a segment 11 of the material where parallel and alternate cuts 12 have been made. The material cut 50 is the result of the first step of the process. In other words, the cutting stage, is used as a base to obtain the mesh through later treatments which the cut material is subjected to;

DESCRIPTION OF THE PREFERRED EMBODIMENT

Figure 1:
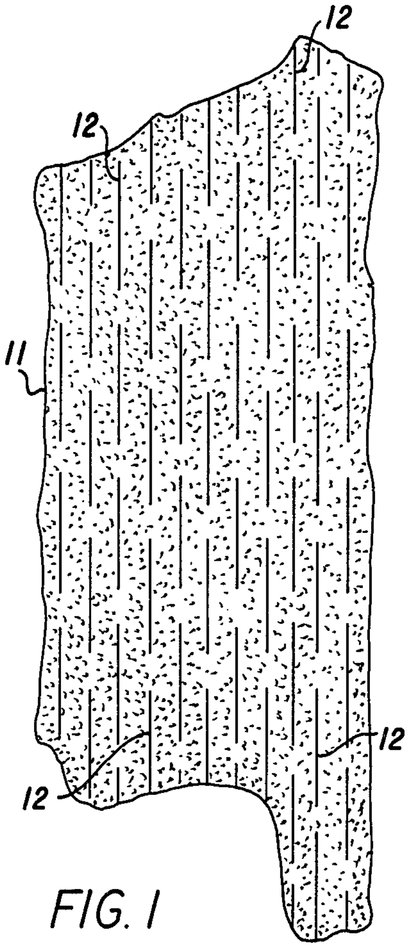
Figure 2:
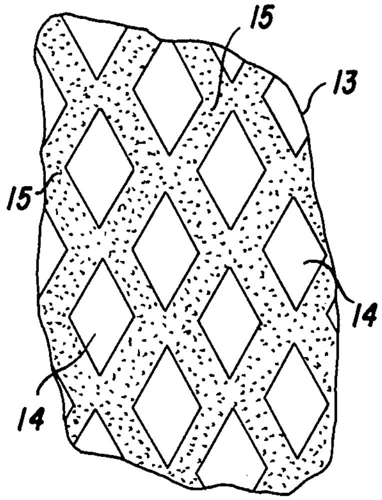
FIG. 2 shows a segment 13 of the mesh illustrating the rhombus 14 which are the empty spaces defined by the portions 15 of the material which make up the mesh. This FIGURE represents the results of the whole process.
Figure 3:
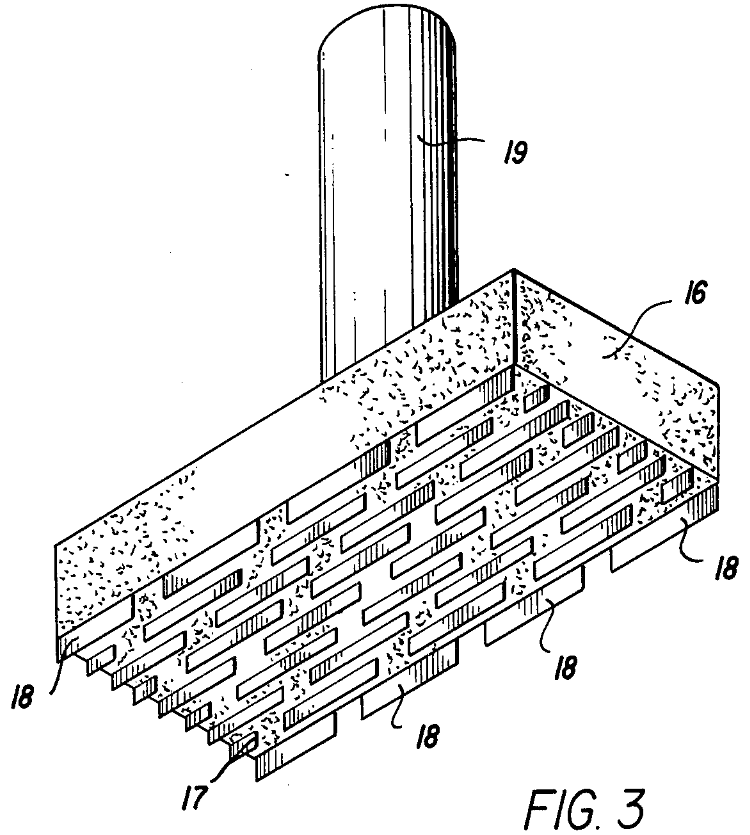
FIG. 3 represents a die made out of a plate or flat bar with the shape of a die 16 with its interior surface 17 which presents many alternated downwardly depending parallel blades or cutters 18 and the bar 19 tightly united to the die in order to raise or lower it as desired, understanding that the dimensions in the die 16 as well as the bar 19 and even in the blades 18 may be changed as desired.
Figure 4:
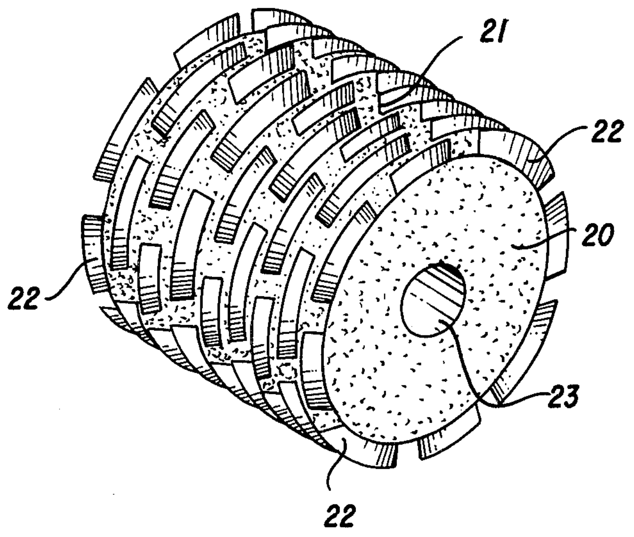
FIG. 4 represents a circle shaped die made by roller 20 which cylindrical surface 21 presents the aligned blades 22 in parallel circles and alternated in order to produce cuts in the material according to FIG. 1. For the performance of this die, a shaft is introduced in the circular space 23 which is connected through mechanism of coupling and gear reduction to a motor shaft in order to make the die turn at a desired and regulated speed. This cylindrical die is placed next to a roller made of soft material and between the die and the cylinder over which the flat material is going to be cut and which at the same time is passed previously through a couple of conveying rollers in such a way that the cutting of the material may be done in a continuous manner.

The process for producing mesh in non-metallic materials which is one of the purposes of the current invention, consists of the following steps: performing a great number of cuts in a preferably flat and relatively thin, non-metallic material; steam treating the material, if necessary; stretching the steam treated material and molding it in the desired shape; if necessary, subjecting the material to a heat treatment so that it may keep its original shape and finishing the obtained material, when required.

The first stage of performing the cuts in the initial material, is performed through the usage of dies with cutting blades, pressing the same with flat or rotary presses, using pressures from 5 to 500 tons per square centimeter.

The steam treatment is performed inside a special steaming chamber, at unsaturated, saturated or super saturated steam temperatures.

The stretching of the soft, steam treated material is mono- or bi-axial and with the necessary stress strength.

The heat treatment is carried out preferably in an aging furnace at temperatures which may vary from 60° to 250° C. or this treatment may be replaced by submitting the material to low temperatures in order to dry and cure the material.

The initial cuts are performed on the initial flat material, preferably in the following fashion: a series of parallel cuts are made in such a way that a certain piece is cut, then, stop cutting and thereafter performing another cut so that this operation is subsequently repeated and continued to use the whole length of the material. The neighboring or adjacent parallel cut is done in such a way that each cut faces a non-cut or uncut portion of the first cutting line. In brief, many parallel, equidistant and alternate cuts are made. Nevertheless, there may be a different distribution of the cuts, for instance, in successive circules which are also alternated which involves an embodiment of this first stage.

Obviously, the type of cut shall depend on the die used, either flat or rotary, since in the first case, the cutting operation requires one stroke only and, in the second one, the cuts are made as the material passes by and it is pressed through the rotary die.

The above mentioned process uses a great variety of starting material since it has a wide application and, therefore, there are not limitations in this regard. So, it can be used in tanned or non-tanned leather, plastic, plastic clothing, combination of these materials, cardboard, paper and, in general, in synthetic or natural materials and its combinations. The usage of a given kind of material shall depend on the practical use and the kind of material one may want to get out of it. For instance, the mesh obtained through the mentioned process may be used to manufacture sportswear, ornamental articles, decorating materials, recipients, furniture, shoes, luggage, dresses, purses and any sort of desired use.

As it may be seen from the uses of the mesh obtained through the mentioned process, there are no limitations, nor in reference to the material used for the process because the important thing is that such materials may keep their final shape.

Some of the materials on which the process is applied are not submitted to steam treatment because, for instance, cardboard and paper could not stand it.

In a similar way, the heat treatment with an aging furnace can be omitted because some of the materials do not require it and they keep their mesh structure without passing through this process.

As to the quality and composition of the raw materials in the flat stage which are used, these factors do not constitute a limitation because the process can be performed on all kind of leathers and raw skins or on those that are tanned with different kinds of techniques; the plastic materials can have any kind of polymeric structure and texture even though soft or semi-stiff plastics are preferred. A similar consideration is applied to the plastified clothes which may be made of any kind of cloths and plastics either monomeric or polymeric.

Experimental trials of the process have shown that the formed mesh keeps all the resistance properties of the original material and, more important, that the mesh keeps its structure, i.e., it does not shrink or deform even though it changes shape when a tension or cutting strength is applied on same but when such strength is released, the mesh tends to recover its shape.

The resistance of the mesh shall depend on the resistance of the raw material. For instance, cardboard and paper are less resistant materials.

An important part of the present invention is the new design for the dies which are used to cut the mesh and which are pressed against the material by flat or rotary presses.

The flat dies can be compact, that is to say, made in a plate or in a solid bar, preferably of steel in which several parallel or alternated blades have been inserted to produce the necessary cuts as a base to form the mesh.

Also, a modular flat die has been designed using many interchangeable discs or blades which have the cutting edge resembling a grecque shape in which the raised portions have a sharp edge alternating the edge of one blade with the parallel one in such a way that the cuts produced are alternated and parallel in the raw material.

Another kind of flat die, designed for the purpose of the present invention, is made in a circle-shaped plate with many concentric blades starting with the blades located at the perimetral edge of the plate. The blades are alternated to produce alternated circular cuts on the material.

The rotary dies were designed forming cylindrical rollers with blades in the cylindrical surface in the same manner as the rollers used in sugar mills or the wheels for the grain mills.

It is also possible to form cylindrical dies putting together many discs with alternated cuts in a similar way to a grecque in their circular edges, alternating the union of one disc with another in such a way that parallel cuts or alternated cuts can be produced on the raw material.

For the work of the circle shaped dies, a cylinder is placed close to the die and with the cylinder the material which is going to be cut is conveyed and at the same time a pressure of the cylinder on the cylindrical die is applied to obtain the mentioned cuts.

In this case, one can use a couple of conveying rollers within which the material to be cut passes by, to guide it between the cylindrical die and the cylinder or roller placed next to it. It is important to notice that the roller next to the cylindrical die is covered with a soft material, so that once the cuts are made, it may absorb the strokes of the blades and does not damage the material.

The pressures used in the flat dies as well as in the rotary ones are variable depending from the kind of material and the dimensions of same and vary between 5 to 500 tons per square centimeter.

With the mentioned cutting system and the subsequent production of the mesh, at least 10% of the material is saved, in relation to the conventional processes and an ornamental and automatic resistance is provided to the product, saving labor and decreasing production costs of the mesh in relation to the same product carried out by craft or by another mechanical conventional manner.

The flat dies as well as the circle flat dies (non-rotary) are designed in such a way that, in case of a metallic solid plate or bar, the cutting blades may be interchangeable so one may sharpen them when necessary.

The same kind of design is used for rotary dies with blades in its cylindrical surface. The blades are inserted through an opening set in the non-sharpened part in a bolt of special design to anchor them in a solid manner. Nevertheless, the system used to fix the blades may be conventional because what is important is that they are set in a way that may produce parallel cuts alternated in the material which is being used.

In the case that there may be many blades or interchangeable steel discs, it is important that the blades and the discs are tightly fixed one with the other together, to resist the pressures of the press without moving and without sliding, to work continuously, without interrupting the cutting operations, unless one may want to remove the blades or discs to sharpen or change them.

This joint of blades is obtained by drilling them near the non-cutting part and passing through them circular or flat bars which are held in the extremes by nuts or wing-nuts or any other kind of device taking into consideration that, if necessary, the cylindrical bars have a thread in their extremes.

In the case of the rotary dies, these have in their center axis, a shaft which may be coupled to a motor shaft to make the dies turn and, if necessary, a motor-reducer or gear reduction to slow down the turning speed and regulate it as desired.

As it can be seen from the aforementioned description, the process and the equipment used for it, are closely related to one another. For instance, the treatments with heat, with steam or without it, are carried out with the purpose of preserving the shape of the mesh of the previously cut material, once that this has been stretched, but so that this may happen, it is necessary that the cutting dies make their cuts with high precision and in an exactly alternated way, and in parallel cutting lines. With this kind of cut, the stretching stage produces a mesh with rhombic empty spaces which has a great structural strength and at the same time appealing to sight and, in some cases besides the ornamental purpose, the function of letting the air go through which is useful, for example, in the shoe industry, packings, purses or baskets to preserve food or materials which require to be oxygenated to prevent spoiling. It is understood that the practical and functional use of the mesh is endless because it may be used for many industries such as clothing, packing and even building because wherever a flexible or semi-rigid mesh is used, it will have a practical use provided by the process of this invention, with no other limit than imagination itself.

The finishing of the mesh is obtained through varnish, dying, covering it with a film which appeals to the sight, polishing it or giving it a finish either conventional or proper for the material of origin.

Up to here, we have described the invention according to one of the preferred embodiments for its performance stating that any variation or manner of performance from the process or the equipment taking into consideration the above mentioned description.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A die for use in a press to produce mesh in non-metallic materials using pressures from 5 to 500 tons per square centimeter, comprising a support member forming a plate or a metallic solid bar having more than two spaced and parallel rows of blades protruding from a surface of said plate or bar, each row of blades comprises a plurality of discrete and spaced cutting blades of equal length protruding from said surface, said blades in each adjacent row alternating with the spaces in between the blades of the next adjacent row.

2. A die to produce mesh in non-metallic materials in accordance with claim 1 characterized in that the plate is rectangular.

3. A die to produce mesh in non-metallic materials in accordance with claim 1 characterized in that the plate is circle shaped and said blades are set in concentrical circles in an alternated setting.

4. A die to produce mesh in non-metallic materials in accordance with claim 1 characterized in that the die is rotary and is formed of a cylindrical roller with said blades on the cylindrical surface, and where said blades are set in circles in an alternate and parallel manner.

5. A die to produce mesh in non-metallic materials in accordance with claim 1 in that the dies, are made of many aligned modular blades one next to and spaced from the other, with cutting edges alternated and grecque shaped in their sharpened elevated portions.

6. A die to produce mesh in non-metallic materials according to claim 3 characterized in that the circle shape plate is made with many circular blades set in a concentric manner with edges grecque shaped and with the alteranted elevated parts sharpened.

7. A die to produce mesh in non-metallic materials according to claim 4 characterized in that the rotary die is made of many discs with edges grecque shaped, alternated and sharpened.

8. A die to produce mesh in non-metallic materials in accordance with claim 7 characterized in that the cylindrical rotary die has a shaft on the central axis of the cylinder, in order to make it turn through a motor shaft, through coupling devices and through a motoreducer.

9. A die to produce mesh in non-metallic materials in accordance with claim 7 characterized in that the cylindrical die is placed next to a cylinder made of soft material in a press to carry the material in which the cuts will be made and to press it against the blades of the cylindrical die and in this way to achieve the desired cuts.

10. A die to produce mesh in non-metallic materials in accordance with claim 9 characterized by said pressing further having a couple of transportation or conveying rollers where the material to be cut is passed, to guide it to the cutting cylindrical die.

11. A die to produce mesh in non-metallic materials in accordance with claim 1 characterized in that the blades are interchangeable.

12. A die to produce mesh in non-metallic materials in accordance with claim 1 characterized in that said plate or solid metallic bar, is made of steel.

* * * * *